(12) United States Patent
Showalter

(10) Patent No.: US 8,231,494 B2
(45) Date of Patent: Jul. 31, 2012

(54) ACTIVE CONTROL CENTER DIFFERENTIAL WITH FRONT OUTPUT

(75) Inventor: Dan J. Showalter, Plymouth, MI (US)

(73) Assignee: Borg Warner, Inc., Auburn Hills, MI (US)

( * ) Notice: Subject to any disclaimer, the term of this patent is extended or adjusted under 35 U.S.C. 154(b) by 871 days.

(21) Appl. No.: 12/239,971

(22) Filed: Sep. 29, 2008

(65) Prior Publication Data

US 2009/0118053 A1    May 7, 2009

Related U.S. Application Data

(60) Provisional application No. 60/986,156, filed on Nov. 7, 2007.

(51) Int. Cl.
*F16H 48/32* (2012.01)
*F16H 48/22* (2006.01)
(52) U.S. Cl. .................................... 475/249; 475/150
(58) Field of Classification Search .............. 475/150, 475/249
See application file for complete search history.

(56) References Cited

U.S. PATENT DOCUMENTS

| 4,440,042 | A | 4/1984 | Holdeman |
| 4,718,303 | A * | 1/1988 | Fogelberg ............... 475/150 |
| 5,106,351 | A | 4/1992 | Williams et al. |
| 5,209,707 | A | 5/1993 | Teraoka |
| 6,155,126 | A * | 12/2000 | Vogt et al. ............... 74/335 |
| 6,263,995 | B1 | 7/2001 | Watson et al. |
| 6,513,615 | B2 | 2/2003 | Bowen et al. |
| 6,830,142 | B2 | 12/2004 | Weilant |
| 6,837,819 | B2 | 1/2005 | Foster |
| 7,037,231 | B2 | 5/2006 | Showalter |
| 7,144,347 | B2 * | 12/2006 | Kushino ............... 475/249 |
| 7,172,528 | B2 | 2/2007 | Yu et al. |
| 7,717,818 | B2 * | 5/2010 | Suzuki et al. ............ 475/150 |
| 2004/0023743 | A1 * | 2/2004 | Cook et al. ............. 475/249 |
| 2004/0040812 | A1 * | 3/2004 | Matsumoto ............. 192/35 |
| 2004/0048714 | A1 | 3/2004 | Phelan et al. |
| 2004/0058774 | A1 | 3/2004 | Perkins et al. |
| 2005/0167224 | A1 * | 8/2005 | Puiu ....................... 192/35 |
| 2005/0167225 | A1 * | 8/2005 | Sakai et al. ............. 192/35 |
| 2007/0034427 | A1 | 2/2007 | Janson et al. |

* cited by examiner

*Primary Examiner* — David D Le
*Assistant Examiner* — Lillian Nguyen
(74) *Attorney, Agent, or Firm* — Brinks Hofer Gilson & Lione

(57) ABSTRACT

A coupling device (16) for use in a motor vehicle has an input member (45), a first and a second output member (46, 47), and a planetary gear set (54, 56, 58, 62) having gears (56, 58, 62) and a planetary gear carrier (54). Each of the input member (45) and the first and second output members (46, 47) are coupled to one of the planetary gear carrier (54) and a gear (56, 58, 62) of the planetary gear set (54, 56, 58, 62). A modulating biasing clutch assembly (70) selectively applies a biasing force to two of the three members. The modulating biasing clutch assembly (70) has an electrical clutch operator (72, 78, 84), a first clutch plate (92) coupled to one of the three members and a second clutch plate (94) coupled to another of the three members.

10 Claims, 12 Drawing Sheets

ACTIVE CONTROL CENTER DIFFERENTIAL WITH FRONT OUTPUT

CROSS REFERENCE TO RELATED APPLICATION

This application claims the benefit of U.S. provisional application No. 60/986,156 filed on Nov. 7, 2007, the entirety of which is hereby incorporated by reference.

BACKGROUND OF THE INVENTION

Currently, there is a drive toward designing more fuel-efficient vehicles, due to the increasing price of petroleum-based fuels and environmental concerns. However, vehicles must maintain good traction and stability. In addition to these requirements, vehicles having four-wheel drive systems must be compatible with brake based vehicle dynamic control (VDC) systems in the vehicle. These design parameters have appeared to be competing, and there has been a trade-off between maintaining compatibility with VDC systems and maintaining traction and stability through the use of a powertrain torque biasing system, while also attempting to increase fuel efficiency through the use of an efficient and effective biasing system. Lightweight compact four-wheel drive torque biasing systems have been designed as passive friction based biasing systems in some differentials having front outputs. The passive nature of these systems has made them less compatible with VDC systems while maintaining a beneficial level of torque biasing.

BRIEF SUMMARY OF THE INVENTION

In satisfying the above need, as well as overcoming the enumerated drawbacks and other limitations of the related art, the present invention provides a compact four-wheel drive powertrain coupling that maintains a beneficial level of torque biasing and compatibility with VDC systems.

In one aspect of the present invention, a coupling device for use in a motor vehicle is provided. The coupling device has an input member, a first output member, a second output member, and a planetary gear set having a plurality of gears and a planetary gear carrier. Each of the input member, the first output member, and the second output member are coupled to one of the planetary gear carrier and a gear of the planetary gear set. A modulating biasing clutch assembly selectively couples together two of the input member, the first output member, and the second output member. The modulating clutch assembly includes an electrical clutch operator and a pair of clutch plates, including a first and second clutch plate. The first clutch plate is coupled to one of the input member, the first output member, and the second output member, and the second clutch plate is coupled to another of the input member, the first output member, and the second output member. The first and second clutch plate are disposed adjacent to each other.

In another aspect of this invention, a planetary differential for use in a motor vehicle is provided. The planetary differential has an input member, a first output member, a second output member arranged coaxially. The input member and the second output member are also arranged concentrically. The planetary differential also includes a planetary gear set having a sun gear, a planetary gear carrier having a set of planetary gears, and a ring gear. The input member is connected to the planetary gear carrier, the first output member is connected to the ring gear, and the second output member is connected to the sun gear. A modulating biasing clutch assembly selectively couples the first output member to the second output member, and includes an electrical clutch operator and clutch plates, including a first group of clutch plates and a second group of clutch plates. The first group of clutch plates is coupled to the first output member, and the second group of clutch plates is coupled to the second output member. The first and second groups of clutch plates are interleaved with each other. The electrical clutch operator is configured to selectively apply a force to the groups of clutch plates to bias the first and second output members.

In yet another aspect of this invention, another embodiment of a planetary differential for use in a motor vehicle is provided. The planetary differential has an input member, a first output member, a second output member arranged coaxially. The input member and the second output member are also arranged concentrically. The planetary differential further includes a planetary gear set having a first sun gear, a planetary gear carrier having a first set of planetary gears and a second set of planetary gears, and a second sun gear. The first set of planetary gears is meshed with the first sun gear, and the second set of planetary gears is meshed with the second sun gear. Further, the first and second sets of planetary gears are meshed with each other. The input member is coupled to the planetary gear carrier, the first output member is coupled to the first sun gear, and the second output member is coupled to the second sun gear. A modulating biasing clutch assembly selectively couples the input member to the first output member, and includes an electrical clutch operator and clutch plates, including a first group of clutch plates and a second group of clutch plates, the first group of clutch plates being coupled to the input member, and the second group of clutch plates being coupled to the first output member. The first and second groups of clutch plates are interleaved with each other. The electrical clutch operator is configured to selectively apply a force to the groups of clutch plates to bias the input member and the first output member.

Further objects, features and advantages of this invention will become readily apparent to persons skilled in the art after a review of the following description, with reference to the drawings and claims that are appended to and form a part of this specification.

DETAILED DESCRIPTION OF THE INVENTION

Figure 1:
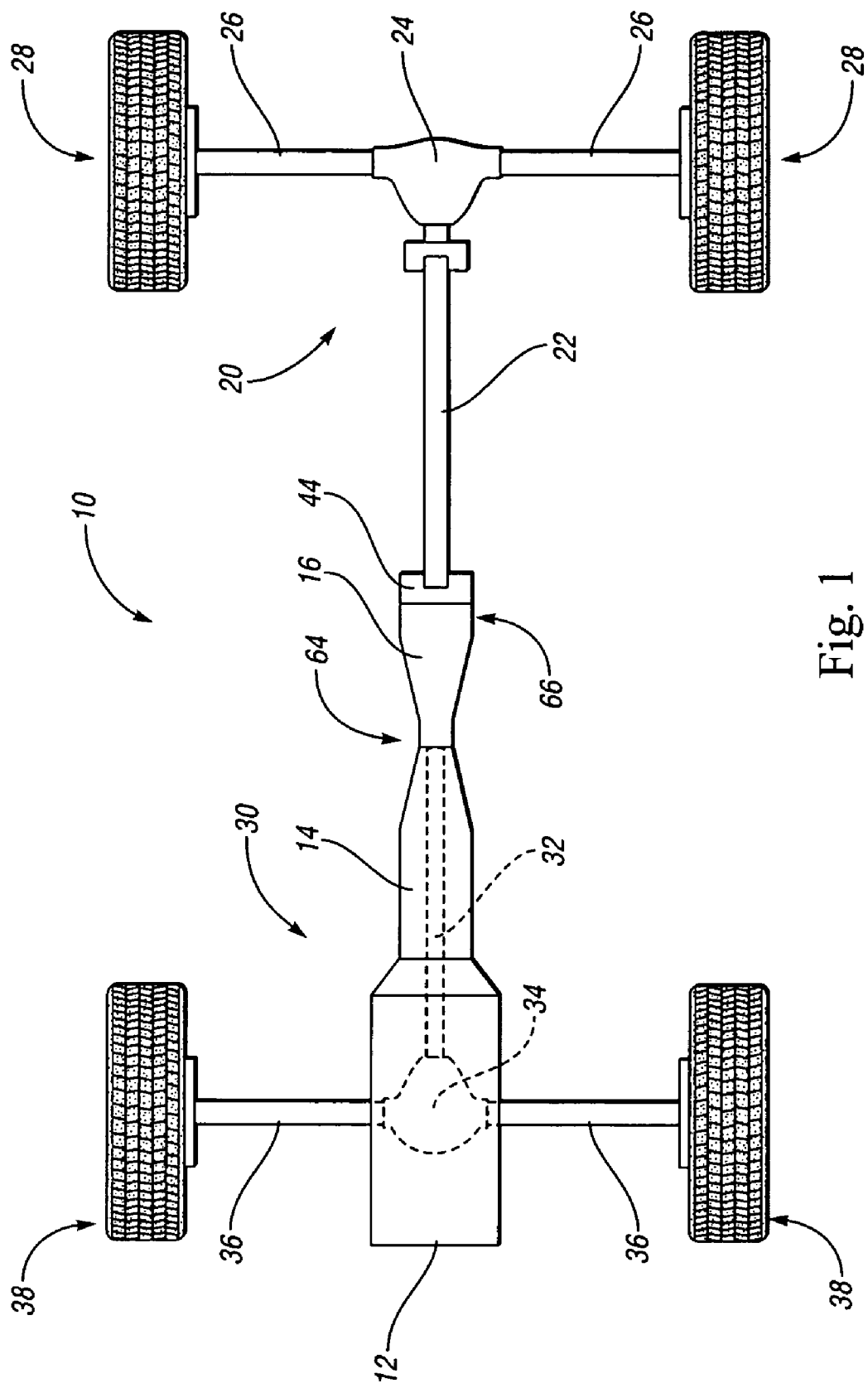
FIG. 1 is a schematic view of a motor vehicle incorporating a coupling according to the principles of the present invention.

Referring now to FIG. 1, a four-wheel vehicle drive train of a motor vehicle is diagrammatically illustrated and designated by the reference number 10. The four-wheel vehicle drive train 10 includes an engine or a prime mover 12 which is coupled to and directly drives a transmission 14, which provides desired gear ratios to couple the prime mover 12 to other drive train components. The transmission 14 may either be an automatic or manual type. The output of the transmission 14 drives a transfer case or a coupling 16 which provides motive power to a rear drive line 20 comprising a rear propeller shaft 22, a rear differential 24, a pair of rear axles 26, and a respective pair of rear tire and wheel assemblies 28.

The coupling 16 also provides motive power to a front drive line 30 comprising a front output shaft 32, a front differential assembly 34, a pair of front axles 36, and a respective pair of front tire and wheel assemblies 38. The front tire and wheel assembly 38 are preferably directly coupled to a respective one of the pair of front axles 36 and would have steering mechanisms (not shown). Both the rear drive line 20 and the front drive line 30, as well as the axles 26, 36, may include suitable and appropriately disposed universal joints 44 (which could be in the form of so-called "constant velocity" joints) which function in conventional fashion to allow static and dynamic offsets and misalignments between various shafts and components.

Figure 2:
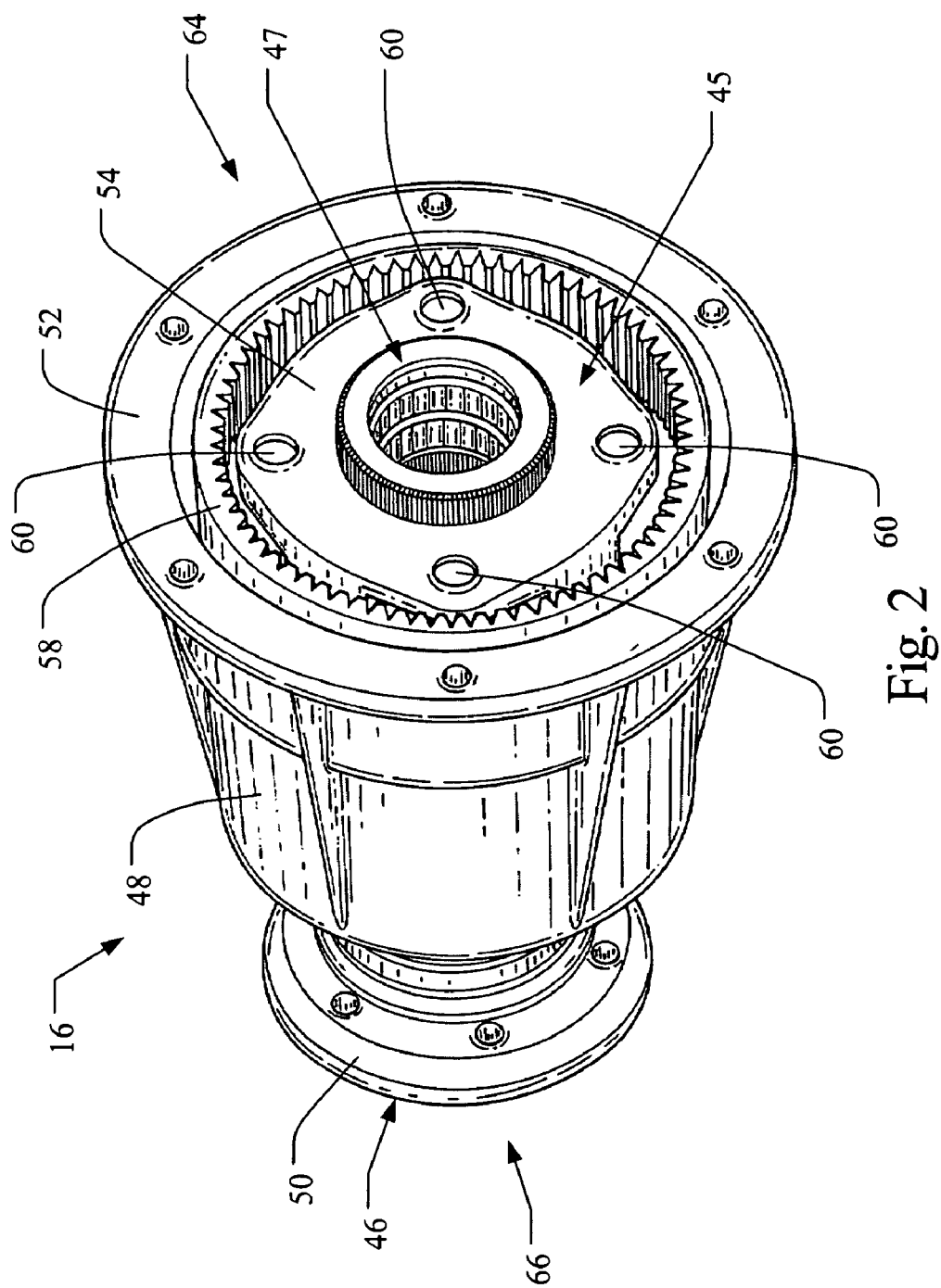
FIG. 2 is a perspective view of a first embodiment of a coupling according to the principles of the present invention.
Figure 3:
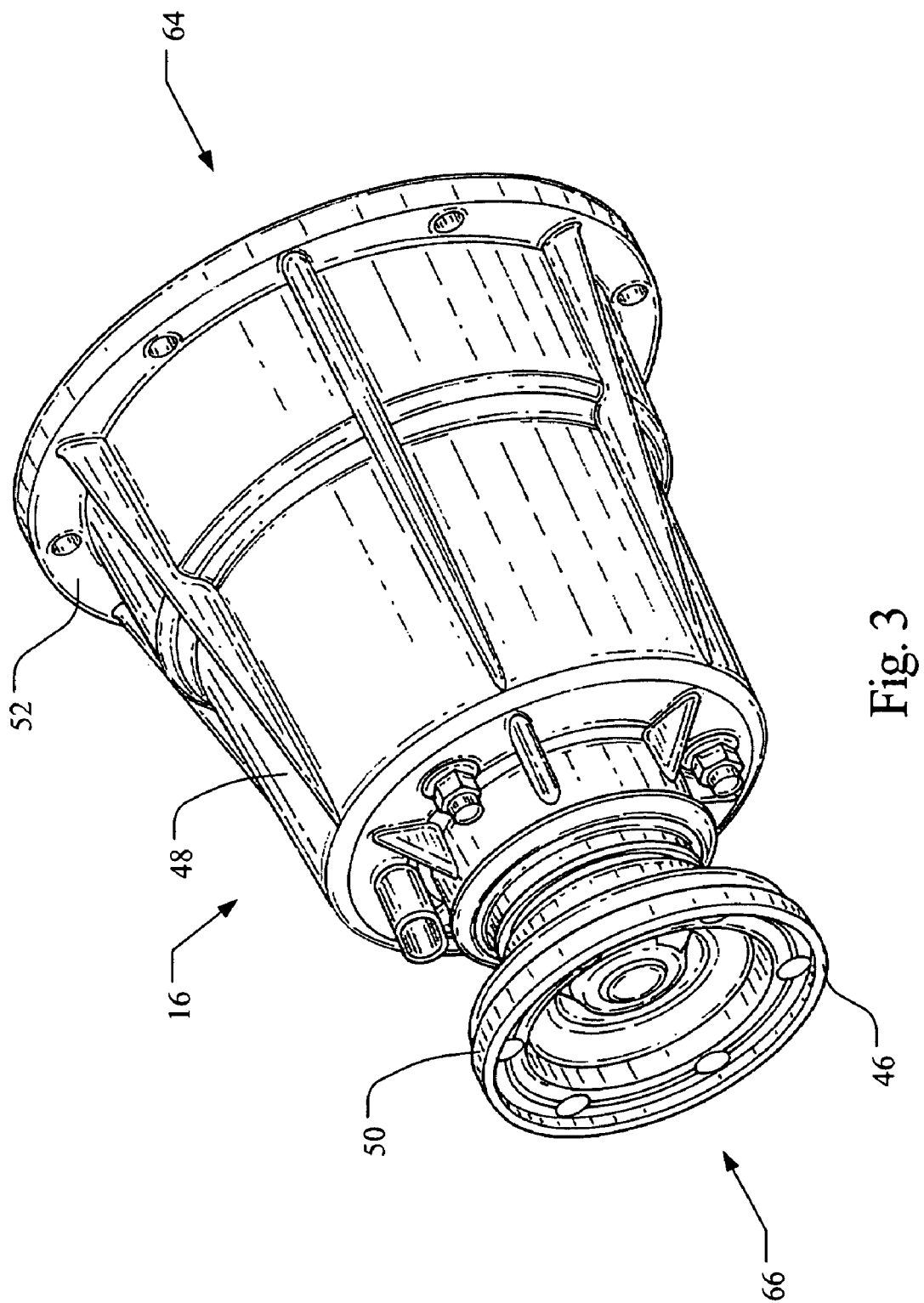
FIG. 3 is another perspective view of the coupling of FIG. 2, in accordance with the principles of the present invention.

With reference to FIGS. 2-3, the coupling 16 is illustrated in a perspective view. The coupling 16 includes a casing 48 having a front flange 52. The front flange 52 is configured to be coupled to the housing of the transmission 14 at a front side 64 of the coupling 16; in the alternative, the front flange 52 could be coupled to another stationary structure. A rear flange 50 is provided at the rear side 66 of the coupling 16, and is preferably connected to a universal or constant velocity joint 44 to connect the coupling 16 to the rear prop shaft 22 (See FIG. 1). Since the rear flange 50 is coupled to a rotatable object (the rear prop shaft 22), the rear flange 50 must also be rotatable. Thus, the rear flange 50 is provided on a first output member 46 of the coupling 16. It should be understood that a universal joint 44 could be positioned between the coupling 16 and any movable components that the coupling 16 is coupled to, for example, a universal joint 44 could connect a movable portion of the coupling 16 to the front output shaft 32.

The coupling 16 has an input member 45, a first output member 46, and a second output member 47. In this embodiment, the first output member 46 is a rear output member and the second output member 47 is a front output member. The coupling 16 is configured as a planetary differential, although it should be understood that other configurations could be employed without falling beyond the spirit and scope of the present invention. Accordingly, the coupling 16 has a planetary gear carrier 54, a sun gear 56 (See FIG. 4), and ring gear 58. The planetary gear carrier 54 has a plurality of planet gears rotatably held at connection points 60.

In the embodiment of FIGS. 2-6, the input member 45 of the coupling 16 is connected to the planetary gear carrier 54. As used herein "connected to" has any meaning known to those skilled in the art and should be interpreted broadly to mean that the members may be attached to each other, connected by another part or parts, or integrally formed as one piece. The input member 45 is configured to be further coupled to the output of the transmission 14. Therefore, the transmission 14 provides a driving force to the coupling 16 through the input member 45. The input member 45 transfers the driving force to the planetary gear carrier 54.

The first output member 46 of the coupling 16 is coupled or connected to the ring gear 58 and is configured to be coupled to the rear prop shaft 22. Thus, the first output member 46 provides an output torque to the rear prop shaft 22, at the rear side 66 of the coupling 16. The second output member 47 of the coupling 16 is coupled or connected to the sun gear 56 and is configured to be further coupled to the front output shaft 32 to provide an output torque thereto, at the front side 64 of the coupling 16. In this embodiment, the front output shaft 32 (or a shaft connected to the front output shaft 32) will pass through a hollow shaft of the transmission output to the front drive line 30. Accordingly, the second output member 47 and the input member 45 are arranged in a concentric, coaxial manner so that the transmission output, which is connected to the input member 45, surrounds the front output shaft 32, which is connected to the second output member 47. Further, input member 45 and the second output member 47 may be arranged coaxially with the first output member 46. This arrangement provides for a very compact active control center differential.

It should be understood that alternatively, the rear prop shaft 22 could be coupled to or connected to either the sun gear 56 or the planetary gear carrier 54, and likewise, the front output shaft 32 could alternatively be coupled to or connected to the planetary gear carrier 54 or the ring gear 58. Similarly, the transmission output, coupled to or connected to the input member 45, could alternatively be coupled to or connected to the sun gear 56 or the ring gear 58.

Figure 4:
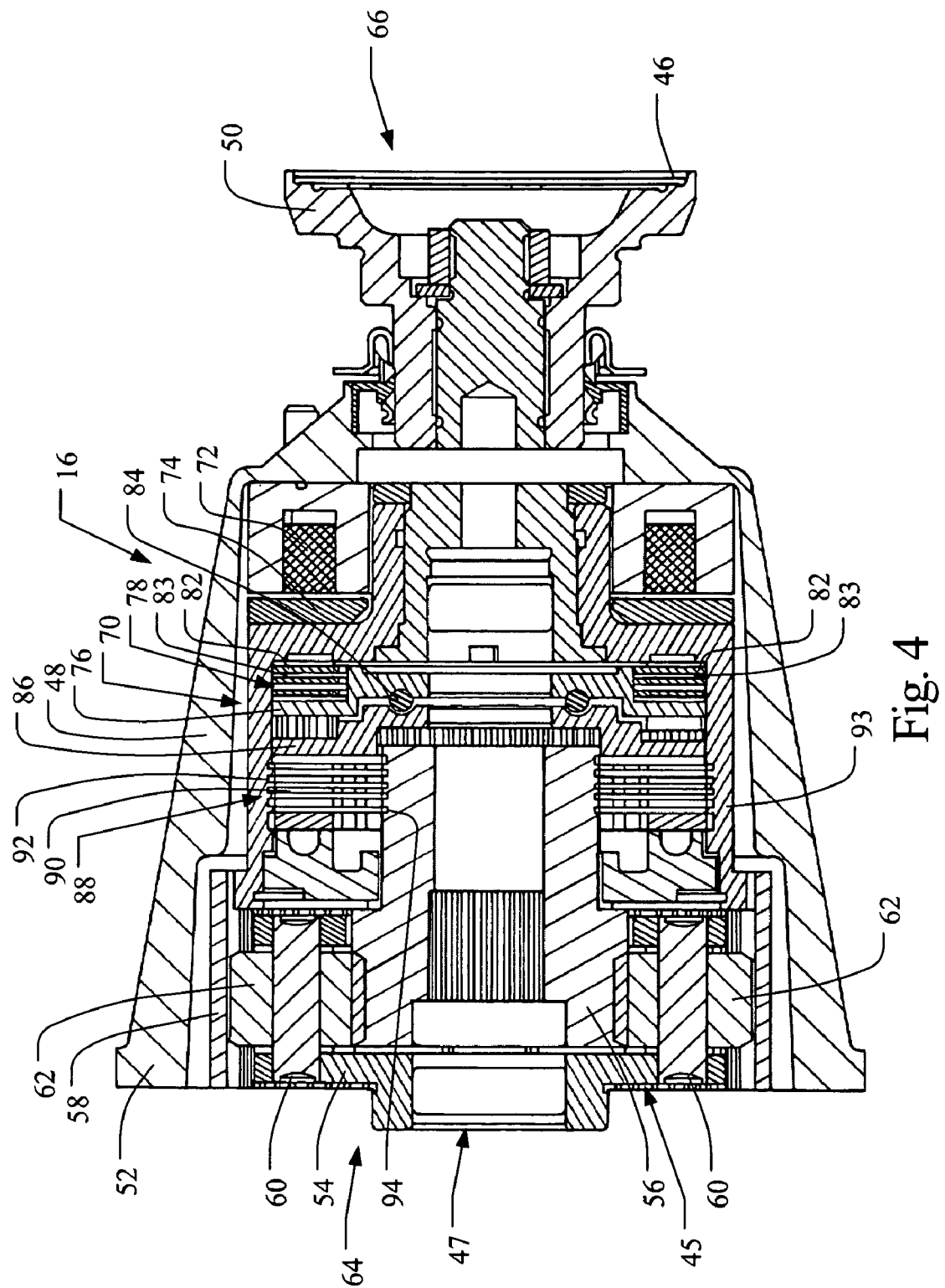
FIG. 4 is a sectional view of the coupling of FIGS. 2 and 3, in accordance with the principles of the present invention.
Figure 5:
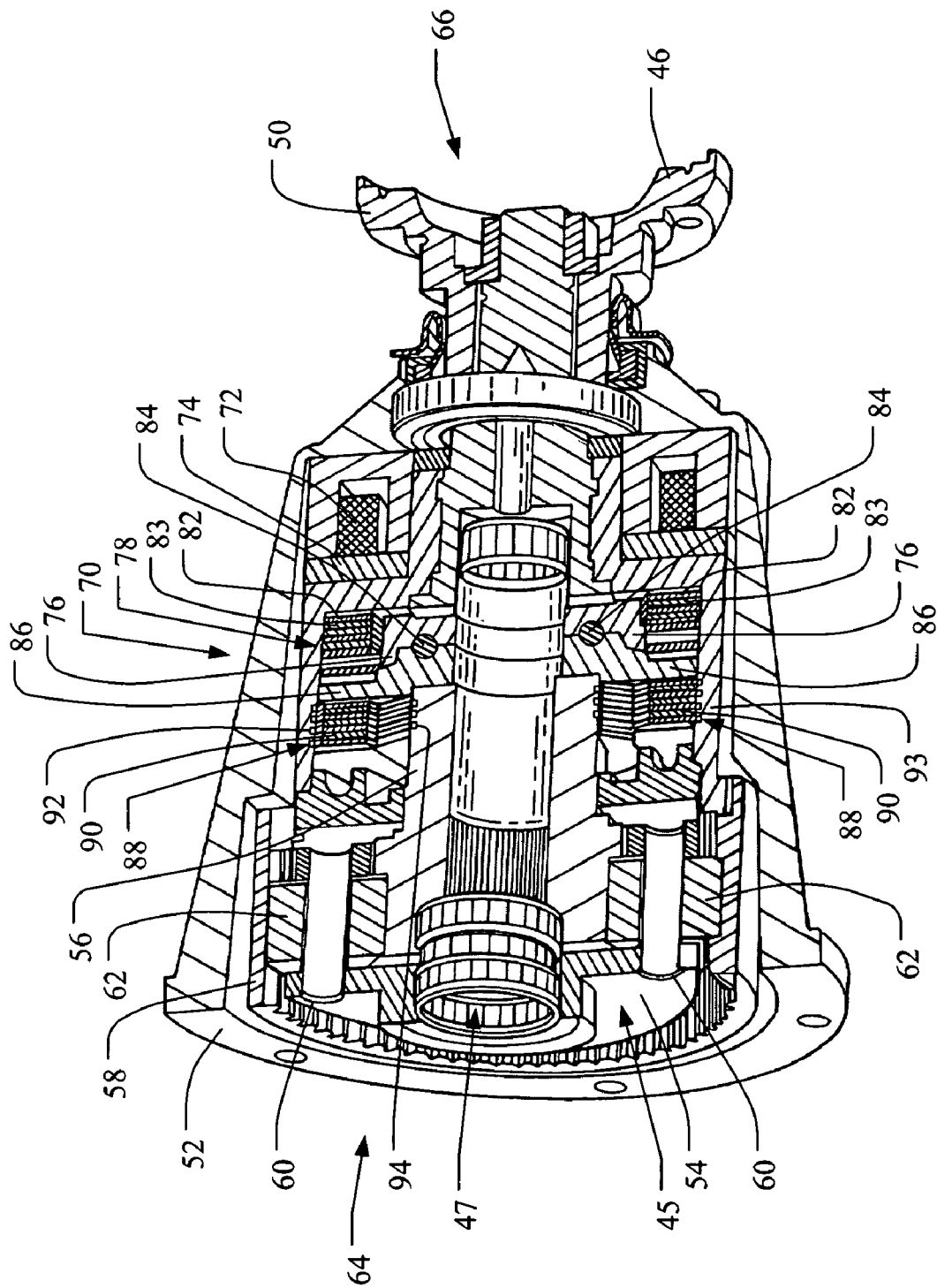
FIG. 5 is a perspective sectional view of the coupling of FIGS. 2-4 having some parts removed, according to the principles of the present invention.
Figure 6:
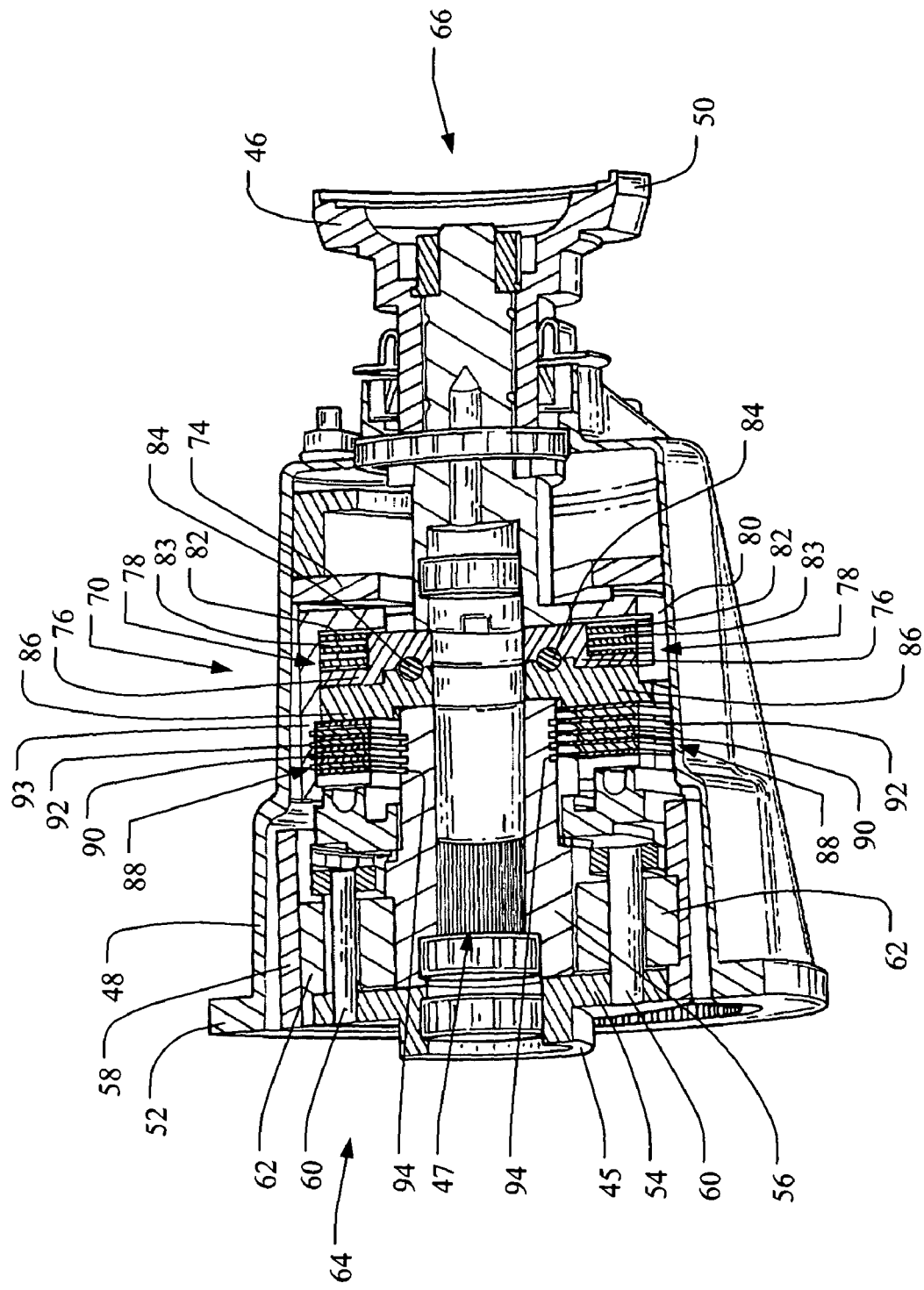
FIG. 6 is another perspective section view of the coupling of FIGS. 2-5 having some parts removed, according to the principles of the present invention.

Referring now to FIGS. 4-6, a cross-sectional view of the coupling 16 is illustrated. The planetary gear carrier 54 has a plurality of planet gears 62 rotatably connected to the planetary gear carrier 54 at connection points 60. The input member 45, connected to the planetary gear carrier 54, is driven by the output of the transmission 14 (See FIG. 1), which provides a rotational input torque to the input member 45 and the planetary gear carrier 54. The planetary gear carrier 54 moves the planet gears 62. The planet gears 62 are meshed with the sun gear 56, and therefore, they transfer motion to the sun gear 56. Since the sun gear 56 is coupled to the second output member 47, an output motion is imparted to the second output member 47 and the front output shaft 32. The gears 56, 58, 62 in the differential may be spur (straight) or helical. Helical gears generally roll smoother, but they generate an axial thrust, which can generally be accommodated with the bearing support structure.

The planet gears 62 also mesh with the ring gear 58 and thereby transfer motion to the ring gear 58. The first (rear) output member 46 is coupled to the ring gear 58 by additional coupling members, including a coupling component 93. Since the first output member 46 is also coupled to the rear prop shaft 22 at the rear side 66 of the coupling 16, motion is transferred to the rear prop shaft 22.

The coupling 16 provides a planetary differential having an unbiased differential ratio between about 60/40 and 70/30, such that the first output member 46 will provide an output torque comprising about 60-70% of the input torque and the second output member 47 will provide an output torque comprising about 30-40% of the input torque. It should be understood that other ranges could be designed into the coupling 16 of the present invention. Further, the torque split could be the opposite, with 30-40% of the input torque distributed to the first output member 46 and 60-70% of the input torque distributed to the second output member 47. In this embodiment, the first output member 46 is shown as providing output torque to the rear prop shaft 22, and the second output member 47 is shown as providing output torque to the front output shaft 32; however, it should be understood that the first output member 46 could alternatively provide output torque to the front output shaft 32, and the second output member 47 could provide output torque to the rear prop shaft 22, without falling beyond the spirit and scope of the present invention.

Further, since the coupling 16 is arranged as a planetary differential, one having skill in the art should understand that if either of the first and second output members 46, 47 were held constant (e.g., if the front or rear of the vehicle is stuck or braking torque is applied), the other of the first and second output members 46, 47 would still be able to impart motion to its respective drive line. However, if a wheel is spinning due to low coefficient of friction or low wheel loading, the coupling 16 will not transmit high torque to the other axle. To address this issue, the coupling 16 can selectively torque couple two of the front output shaft 32, the rear prop shaft 22, and the transmission 14 output shaft, which will be described in further detail below.

The coupling 16 further comprises a modulating biasing clutch assembly 70, which selectively couples the first output member 46 to the second output member 47, urging them to rotate at the same speed or closer to the same speed rather than having them torque coupled through the planetary differential. The clutch assembly 70 includes an electrical clutch operator comprising a solenoid coil 72, a primary clutch pack 78, and a ball ramp operator 84. The solenoid coil 72 generates a pulling force on a solenoid plunger, for example, an annular armature 74, which is connected to a primary apply plate 76 or pressure plate of a primary clutch pack 78 by means of three connecting pins 80. The primary clutch pack 78 comprises first and second pluralities of primary clutch plates 82, 83. When a sufficient pulling force is applied to the armature 74, the armature 74 moves toward the solenoid coil 72 and forces the primary apply plate 76 to compress the primary clutch pack 78. As the primary apply plate 76 compresses the primary clutch pack 78, a ball ramp operator 84 is engaged. The ball ramp operator 84 includes a plurality of ball bearings 85 that move up corresponding ramps to separate, or push apart, the primary apply plate 76 and a secondary apply plate 86. As the secondary apply plate 86 is pushed away from the primary apply plate 76, it compresses a secondary clutch pack 88.

The secondary clutch pack 88 has a plurality of clutch plates 90, which includes a first plurality of clutch plates 92 and a second plurality of clutch plates 94. In other embodiments, the plurality of clutch plates 90 could comprise merely one first clutch plate 92 and one second clutch plate 94. The first plurality of clutch plates 92 is coupled to the first output member 46 by virtue of the first plurality of clutch plates 92 being splined to or rotationally connected to a coupling component 93 that is attached to the ring gear 58. Each clutch plate of the second plurality of clutch plates 94 is rotationally connected to the second output member 47. The first and second pluralities of clutch plates 92, 94 are interleaved with each other. In an uncompressed state, the clutch plates 92, 94 are modulating, each spinning with the part to which each is connected. When a force is applied against the secondary clutch pack 88 by the secondary apply plate 86, the clutch plates of the first and second pluralities of clutch plates 92, 94 move closer together and friction is created between them. The friction between the clutch plates resists the movement of the first and second pluralities of clutch plates 92, 94 relative to each other, thereby biasing the first and second output members 46, 47. Coupling each of the first and second pluralities of clutch plates 92, 94 to one of the first and second output members 46, 47 achieves a multiplying effect on the biasing clutch and therefore results in a lower actuator torque input requirement to achieve the same biasing axle to axle rather than biasing between the input member 45 and one of the first and second output members 46, 47. The coupling 16 performs all of the functions of a conventional transfer case, while having less than half of the weight and being much smaller in size, due to the inventive compact design of the present invention.

The modulating clutch assembly 70 can be designed such that the first and second pluralities of clutch plates 92, 94 still have some relative motion, even when the secondary clutch pack 88 is compressed. With such a design, the coupling 16 is a biasing differential. In other words, upon application of a force on the secondary clutch pack 88, the first and second output members 46, 47 move at velocities closer to being equal to each other, but they are not locked together. In this way, the rotational velocities of the front and rear prop shafts 22, 32 can be biased to bring them closer to equal.

In the alternative, or in addition, the modulating clutch assembly 70 can be designed to become a locking differential, such that when the secondary clutch pack 88 is compressed, the first and second output members 46, 47, and thus, the front and rear prop shafts 32, 22 rotate together at equal velocities. As one having ordinary skill in the art would understand, if the first and second output members 46, 47 are locked together, they will rotate with the input member 45.

Although FIGS. 2-6 show the modulating clutch assembly 70 as being operable to bias the first and second output members 46, 47, it should be understood that, in the alternative, the clutch assembly 70 could be operable to bias the input member 45 to one of the first and second output members 46, 47.

The biasing modulating clutch assembly of the present invention may have other appropriate configurations not necessarily including a solenoid coil 72, a primary clutch pack 78, and a ball ramp operator 84. Other examples include, but are not limited to, electromechanical devices and electrohydraulic devices. For example, the clutch assembly 70 could be a single stage clutch with the force applied by a cylinder piston arrangement. The coupling 16 may include any appropriate electric motor configured to mechanically compress the clutch plates 90, without falling beyond the spirit and scope of the present invention. An electrohydraulic device may include an electric pump and/or an electrically actuated valve to hydraulically compress the clutch plates 90.

Figure 7:
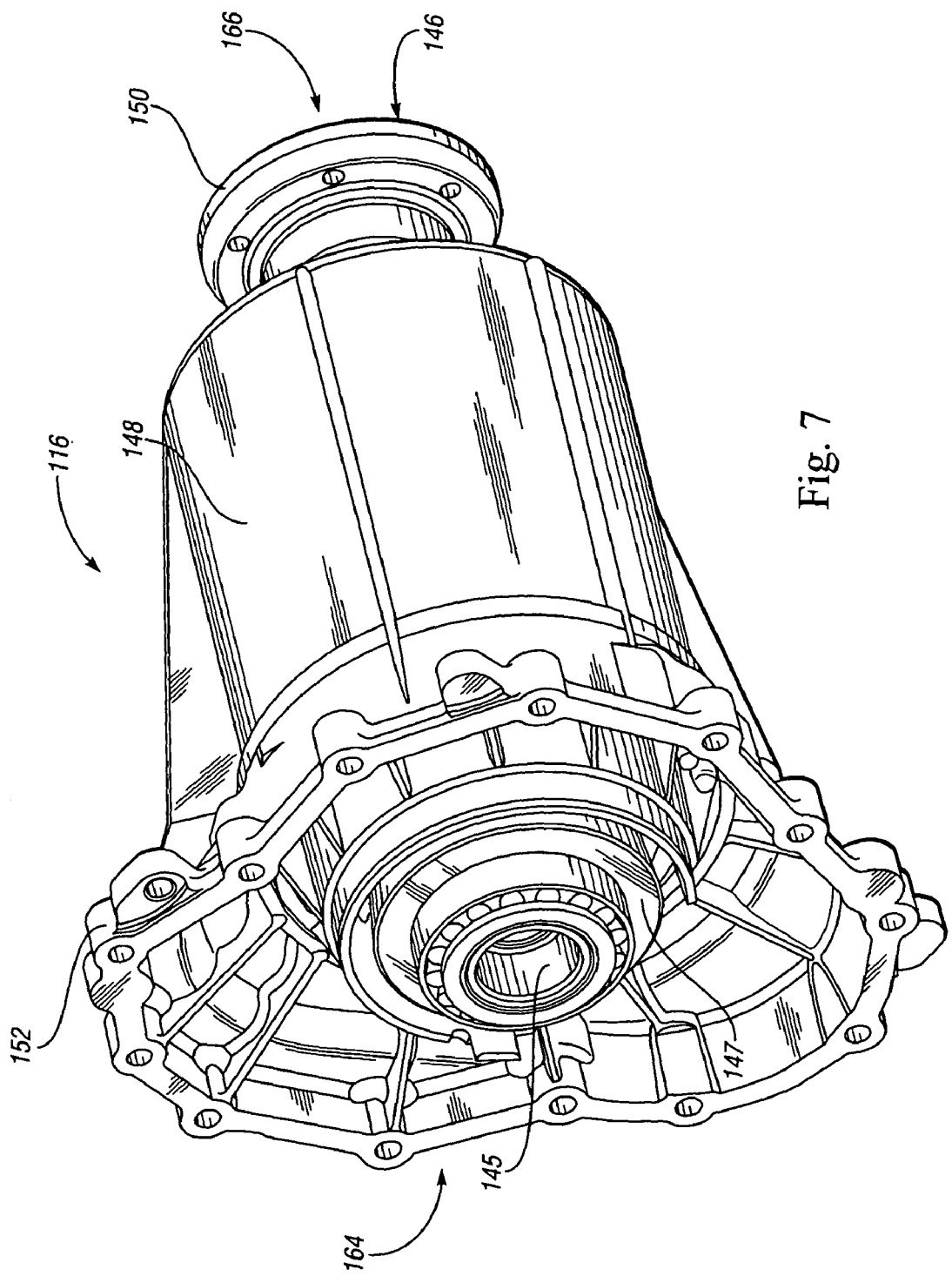
FIG. 7 is a perspective view of a second embodiment of a coupling according to the principles of the present invention.
Figure 8:
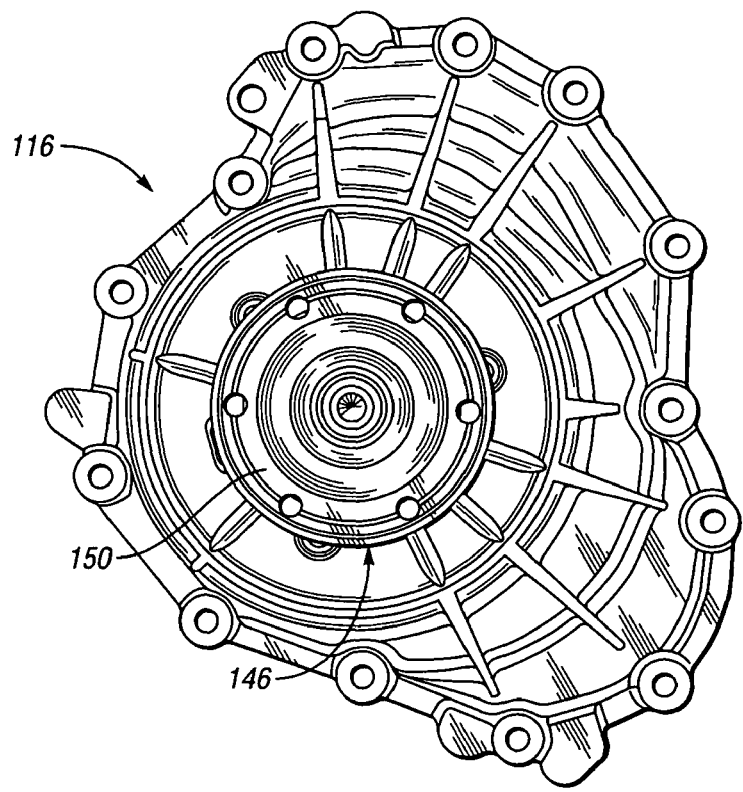
FIG. 8 is a front view of the coupling of FIG. 7, in accordance with the principles of the present invention.
Figure 9:
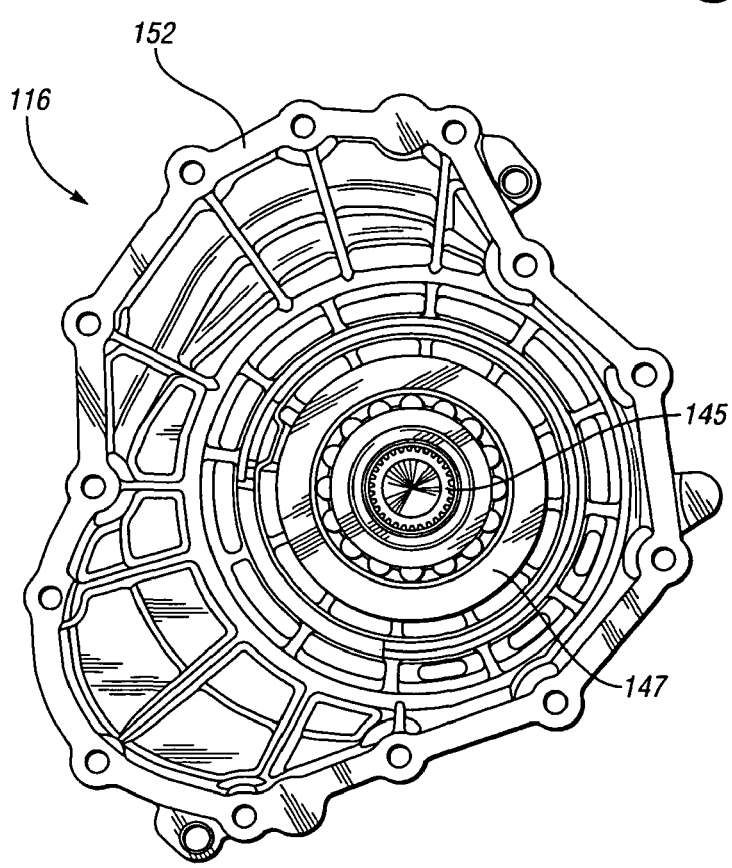
FIG. 9 is a rear view of the coupling of FIGS. 7 and 8, in accordance with the principles of the present invention.

With reference to FIGS. 7-9, another coupling 116 is illustrated. Similarly to the coupling 16 of FIGS. 2-6, the coupling 116 includes a casing 148 having a front flange 152 at a front side 164 that is configured to be connected to the housing of the transmission 14 and a rear flange 150 provided at the rear side 166 of the coupling 116. Like the rear flange 50 of FIGS. 2-6, the rear flange 150 of FIGS. 7-13 is provided on the first output member 146 and is coupled to the rear prop shaft 22. Universal joints 44 could be positioned between the coupling 116 and any movable components that the coupling 116 is coupled to, for example, a universal joint 44 could connect a movable portion of the coupling 116 to the front output shaft 32 or the rear prop shaft 22.

The coupling 116 has an input member 145, a first output member 146, and a second output member 147. The first output member 146 is a rear output member and the second output member 147 is a front output member. In this embodiment, the second output member 147 extends concentrically around the input member 145. The input member 145 is configured to be coupled to a transmission output shaft. The second output member 147 is configured to be attached to a front output that is coupled with the front output shaft 32. The front output extends outward from the front side 164 of the coupling 116 such that the transmission output shaft extends through a center portion of the front output to connect to the coupling 116. The first output member 146 extends from the rear side 166 of the coupling 116. Thus, the input member 145 and the second output member 147 are arranged coaxially and concentrically. Further, the first output member 146 is arranged coaxially with the input member 145 and the second output member 147.

With reference to FIGS. 10-13, the coupling 116 is configured as a planetary differential having a planetary gear carrier 154, a first sun gear 155, and a second sun gear 156. The planetary gear carrier 154 has a plurality of first planet gears 161 and a plurality of second planet gears 162. The first planet gears 161 are meshed with the first sun gear 155, and the second planet gears 162 are meshed with the second sun gear 156. Further the first and second planet gears 161, 162 are meshed with each other. In the present embodiment, the input member 145 is coupled to the planetary gear carrier 154, the first output member 146 is coupled to the first sun gear 155, and the second output member 147 is coupled to the second sun gear 156.

When the input member 145 is coupled to the transmission 14 output shaft, the transmission 14 output shaft transfers a driving motion to the input member 145. The input member 145 transfers the driving motion from the transmission 14 to the planetary gear carrier 154, causing it to rotate. The planetary gear carrier 154 imparts motion to each of the first and second sets of planet gears 161, 162. Because the first planet gears 161 are meshed with the first sun gear 155, the first planet gears 161 transfer motion to the first sun gear 155. Likewise, because the second planet gears 162 are meshed with the second sun gear 156, the second planet gears 162 transfer motion to the second sun gear 156. The first sun gear 155 is coupled to the first output member 146, and therefore, motion is transferred from the first sun gear 155 to the first output member 146 and to the rear prop shaft 22. The second sun gear 156 is coupled to the second output member 147, and therefore, motion is transferred from the second sun gear 156 to the second output member 147 and the front output shaft 32.

It should be understood that alternatively, the rear prop shaft 22 could be coupled to either the second sun gear 156 or the planetary gear carrier 154, and likewise, the front output shaft 32 could alternatively be coupled to the planetary gear carrier 154 or the first sun gear 155. Similarly, the transmission 14 output, which is coupled to the input member 145, could alternatively be coupled to one of first and second sun gears 155, 156.

Figure 10:
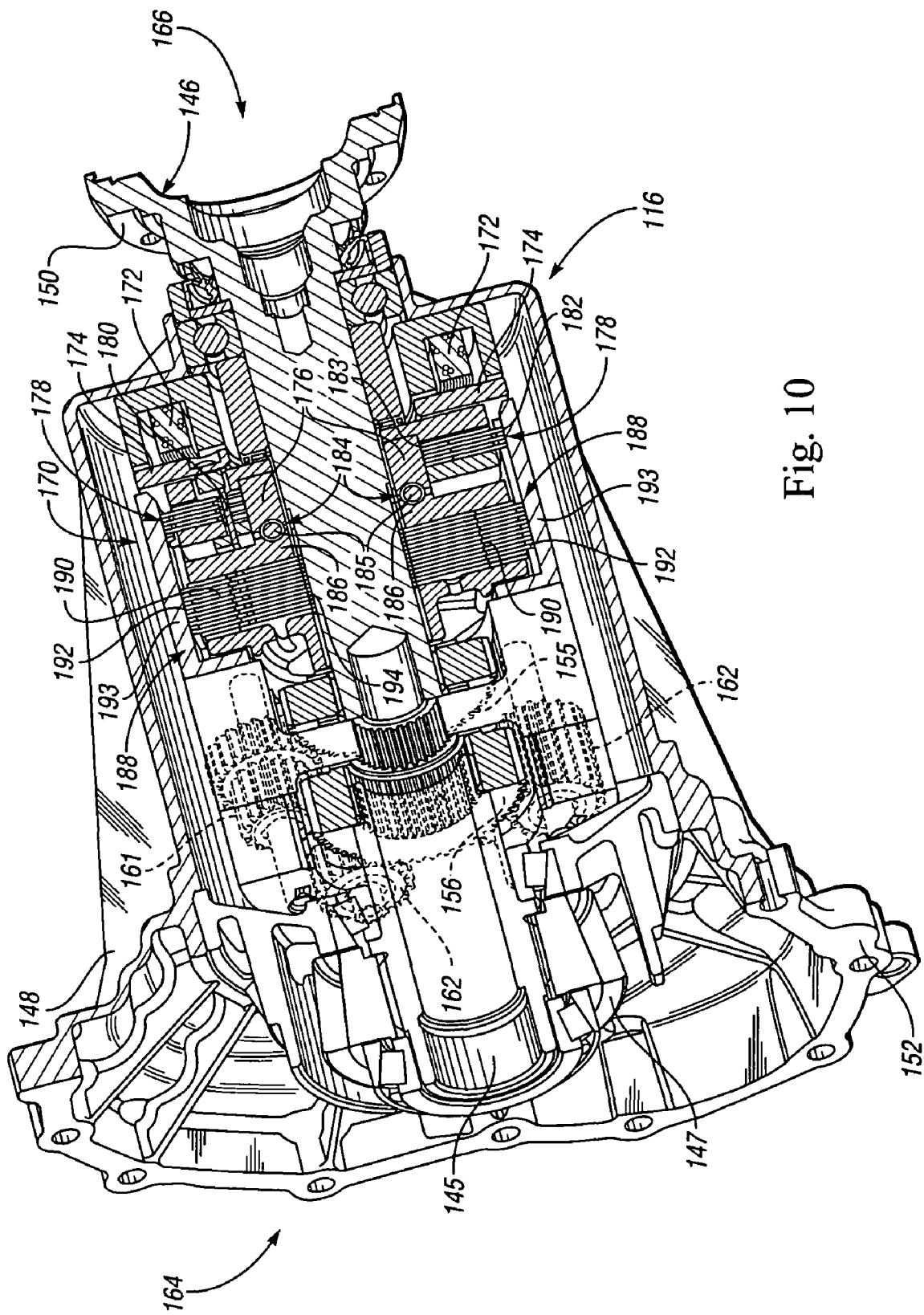
FIG. 10 is a perspective sectional view of the coupling of FIGS. 7-9, in accordance with the principles of the present invention.
Figure 11:
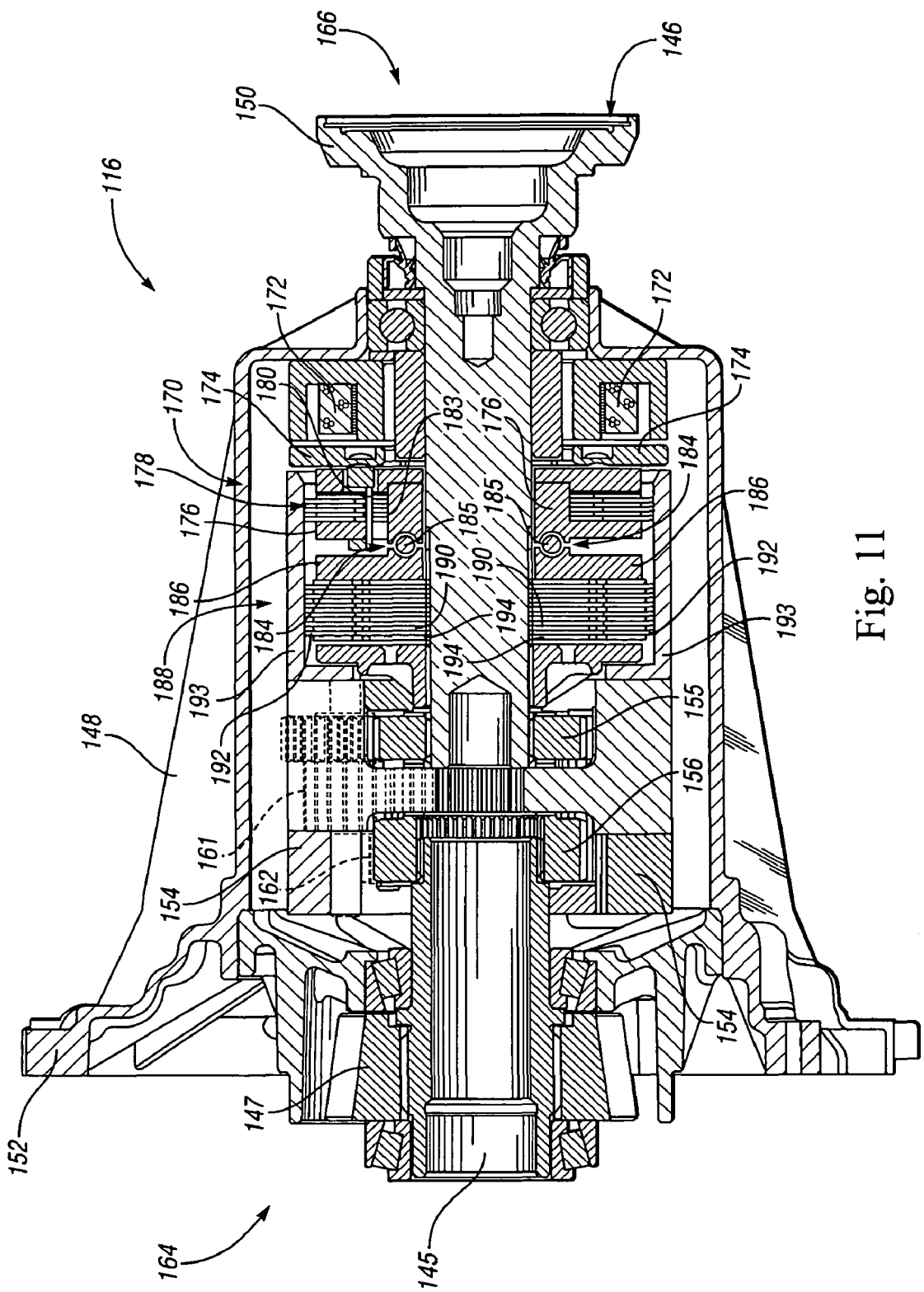
FIG. 11 is a sectional view of the coupling of FIGS. 7-10, in accordance with the principles of the present invention.

Referring now to FIGS. 10 and 11, cross-sectional views of the coupling 116 are illustrated. The coupling 116 further comprises a modulating biasing clutch assembly 170, which selectively couples the input member 145 to the first output member 146. The clutch assembly 170 operates similarly to the clutch assembly 70 of FIGS. 2-6, wherein the clutch assembly 170 comprises a solenoid coil 172 and armature 174 connected by pins 180 to a primary apply plate 176 or pressure plate, a primary clutch pack 178 having first and second pluralities of primary clutch plates 182, 183, a ball ramp operator 184 comprising ball bearings 185, and a secondary clutch pack 188 having a secondary apply plate 186.

The secondary clutch pack 188 has a plurality of clutch plates 190, which includes a first plurality of clutch plates 192 and a second plurality of clutch plates 194. The first plurality of clutch plates 192 is connected to an annular coupling member 193, which is coupled to the input member 145. The second plurality of clutch plates 194 is connected to the first output member 146. Similarly to the first and second pluralities of clutch plates 92, 94 of FIGS. 4-6, the first and second pluralities of clutch plates 92, 94 are interleaved with each other. In an uncompressed state, the clutch plates 192, 194 are modulating, each spinning with the part to which each is connected. When a force is applied against the secondary clutch pack 188 by the secondary apply plate 186, the clutch plates of the first and second pluralities of clutch plates 192, 194 will move closer together and friction will be created between them. The friction between the clutch plates resists the movement of the first and second pluralities of clutch plates 192, 194 relative to each other, to bias the input member 145 and the first output member 146.

The modulating clutch assembly 170 can be designed such that the first and second pluralities of clutch plates 192, 194 still have some relative motion, even when the secondary clutch pack 188 is compressed. With such a design, the coupling 116 is a biasing differential. In other words, upon application of a force on the secondary clutch pack 188, the input member 145 and the first output member 146 move at velocities closer to being equal to each other, but they are not locked together. In this way, the rotational velocities of the front and rear prop shafts 22, 32 can be biased to bring them closer to equal. In the alternative, or in addition, the modulating clutch assembly 170 can be designed to become a locking differential, as hereinbefore described with reference to FIGS. 4-6.

Figure 12:
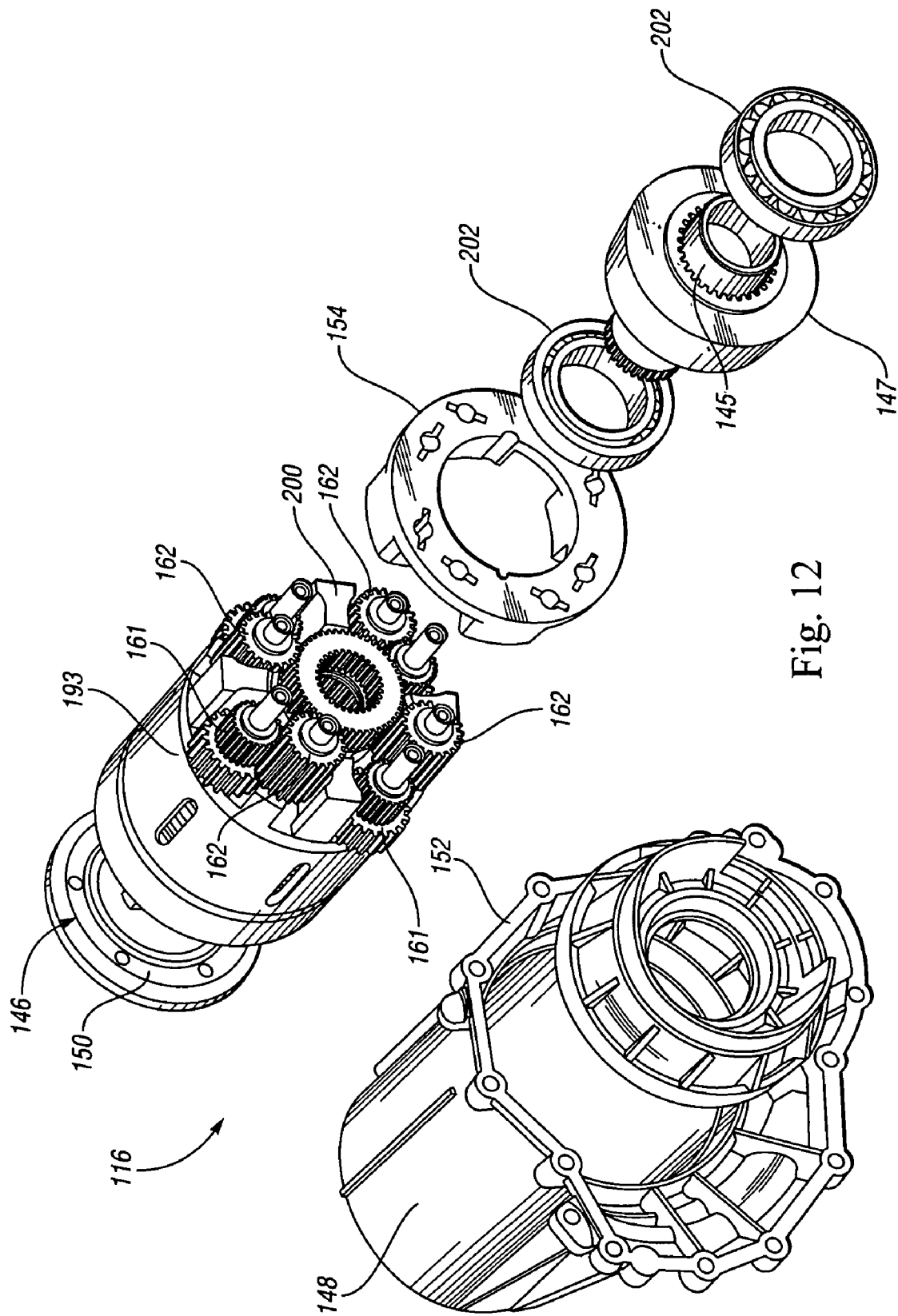
FIG. 12 is a partially exploded view of the coupling of FIGS. 7-11, in accordance with the principles of the present invention.
Figure 13:
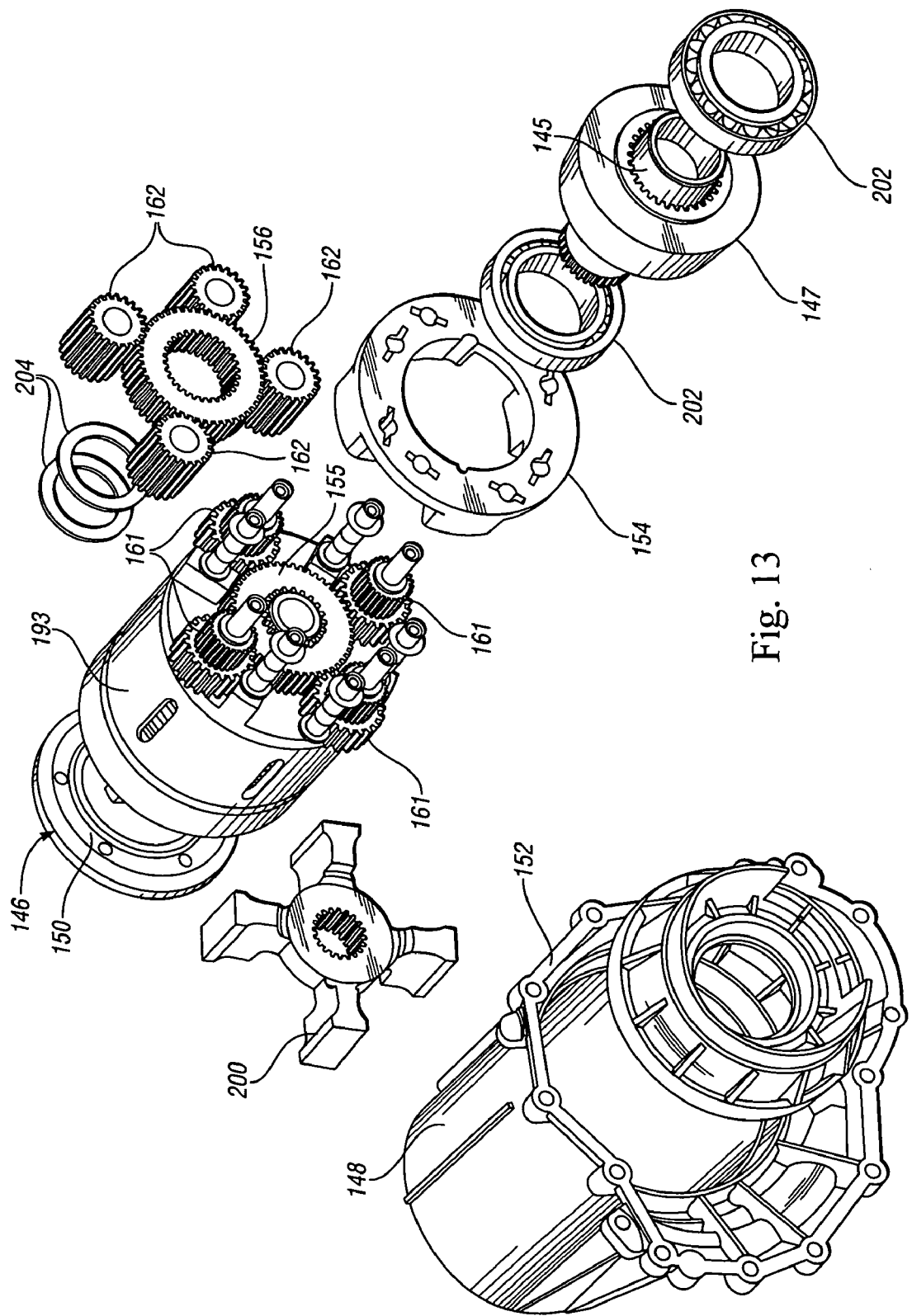
FIG. 13 is another partially exploded view of the coupling of FIGS. 7-12, in accordance with the principles of the present invention.

With reference to FIGS. 12-13, an alignment piece 200, bearings 202, and seals 204 are illustrated for completeness.

As a person skilled in the art will readily appreciate, the above description is meant as an illustration of implementation of the principles this invention. This description is not intended to limit the scope or application of this invention in that the invention is susceptible to modification, variation and change, without departing from the spirit of this invention, as defined in the following claims.

The invention claimed is:

1. A coupling device (16) for use in a motor vehicle, the coupling device comprising:
    an input member (45, 145), a first output member (46), and a second output member (47);
    a planetary gear set (54, 56, 58, 62) having a ring gear (58), a sun gear (56) a planetary gear carrier (54) with a plurality of planet gears (62) rotatably mounted thereon, the planet gears meshing with both the sun gear (56) and the ring gear (58), each of the input member (45), the first output member (46), and the second output member (47) being coupled to one of the planetary gear carrier (54) the ring gear (58) and the sun gear (56) of the planetary gear set (54, 56, 58, 62); and
    a modulating biasing clutch assembly (70) selectively coupling two of the input member (45), the first output member (46), and the second output member (47), the modulating biasing clutch assembly (70) including an electrical clutch operator (72, 78, 84), at least one first clutch plate (92) directly coupled to the ring gear and at least one second clutch plate (94) directly coupled to the sun gear (56), the at least one first clutch plate (92) being coupled to one of the input member (45), the first output member (46), and the second output member (47), and the at least one second clutch plate (94) being coupled to another of the input member (45), the first output member (46), and the second output member (47), the at least one first and second clutch plates (92, 94) being disposed adjacent to each other.

2. The coupling device (16) of claim 1, wherein the modulating biasing clutch assembly (70) is arranged to selectively couple the first output member (46) and the second output member (47).

3. The coupling device (16) of claim 2, wherein the at least one first clutch plate is a first plurality of clutch plates (92) and the at least one second clutch plate (94) is a second plurality of clutch plates (94), the first and second pluralities of clutch plates (92, 94) being interleaved with each other, the first plurality of clutch plates (92) being coupled to the first output member (46) and the second plurality of clutch plates (94) being coupled to the second output member (47).

4. The coupling device (16) of claim 3, wherein the electrical clutch operator (72, 78, 84) is configured to selectively apply a force to the plurality of clutch plates (90) to bias the first and second output members (46, 47).

5. The coupling device (16) of claim 4, further comprising:
a primary clutch pack (78) having first and second pluralities of primary clutch plates (82, 83), the first plurality of primary clutch plates (82) being interleaved with the second plurality of primary clutch plates (83); and
a pressure plate (76) adjacent to the primary clutch pack (78),
wherein the electrical clutch operator (72, 78, 84) comprises a solenoid coil (72), and energization of the solenoid coil (72) translates a solenoid plunger (74, 80), causing the pressure plate (76) to compress the primary clutch pack (78), and wherein compression of the primary clutch pack (78) engages a ball ramp operator (84) to compress the first and second pluralities of clutch plates (92, 94) of the modulating biasing clutch assembly (70).

6. The coupling device (16) of claim 1, wherein the input member (45) is further coupled to a transmission (14) output shaft, the first output member (46) is further coupled to a rear propeller shaft (22), and the second output member (47) is further coupled to a front output shaft (32).

7. The coupling device (16) of claim 1, wherein the input member (45) and at least one of the first and second output members (46, 47) are arranged coaxially.

8. The coupling device (16) of claim 7, wherein each of the input member (45), the first output member (46), and the second output member (47) are arranged coaxially.

9. The coupling device (16) of claim 8, wherein the input member (45) and the second output member (47) are arranged concentrically.

10. A planetary differential (16) for use in a motor vehicle, the planetary differential (16) comprising:
an input member (45), a first output member (46), and a second output member (47) being arranged coaxially, the input member (45) and the second output member (47) being arranged concentrically;
a planetary gear set including a sun gear (56), a planetary gear carrier (54) having a set of planet gears (62), and a ring gear (58), the input member (45) being connected to the planetary gear carrier (54), the first output member (46) being connected to the ring gear (58), and the second output member (47) being connected to the sun gear (56); and
a modulating biasing clutch assembly (70) selectively coupling the first output member (46) to the second output member (47), the modulating biasing clutch assembly (70) including an electrical clutch operator (72, 78, 84), a first plurality of clutch plates directly coupled to the ring gear (58), and a second plurality of clutch plates (94) directly coupled to the sun gear (56), the first plurality of clutch plates (92) being coupled to the first output member (46), and the second plurality of clutch plates (94) being coupled to the second output member (47), the first and second pluralities of clutch plates (92, 94) being interleaved with each other, the electrical clutch operator (72, 78, 84) being configured to selectively apply a force to the first and second pluralities of clutch plates (92, 94) to bias the first and second output members (46, 47).

\* \* \* \* \*